Patented Mar. 13, 1951

2,544,668

UNITED STATES PATENT OFFICE 2,544,668

WERNER-TYPE CHROMIUM COMPOUNDS

Max T. Goebel, Rocky River, and Ralph K. Iler, Cleveland Heights, Ohio, assignors to E. I. du Pont de Nemours & Company, Wilmington, Del., a corporation of Delaware No Drawing. Application April 27, 1946, Serial No. 665,610

4 Claims. (Cl. 260—438)

This invention relates to novel compositions and processes for producing them, to processes employing these compositions for effecting chemical bonding between diverse materials, and to articles so bonded. More particularly, the invention is directed to complex compounds of the Werner type in which trivalent nuclear chromium atoms are coordinated with organic acido groups containing an —XH radical, where X stands for oxygen or R-substituted nitrogen, R being hydrogen or a hydrocarbon group, the ratio of nuclear metal atoms to such coordinated groups being about from 1:1 to 10:1; to processes for making Werner-type complex compositions comprising effecting contact, in solution, between —XH-substituted organic acid groups and basic salts of chromium, such salts being salts of monobasic acids having a basicity no greater than about fifty per cent; to processes in which chemical bonding is effected between diverse materials by bonding the metal atom of an acido-XH Werner complex compound of said metals to a material having a negatively charged surface and polymerizing an organic polymer selected from the group consisting of polyesters, polyamides, and polycarboxylic acids in contact with the —XH group of the complex, whereby a chemical bond is formed between the complex and the polymer; and to the chemically bonded articles so produced.

The desirability of effecting improved bonding between diverse materials has been recognized in a variety of situations. It has been realized that composite structures made up of dissimilar materials could possess the advantageous properties of each of the constituent materials and at the same time have additional, especially desirable properties resulting from the combination, if only suitable ways of effecting permanent joining of the materials could be found. Thus, it was proposed to embed a mass of fibers, such as rayon cord, in a continuous phase of a diverse material, rubber, to produce a structure having the strength of the fibers and the elasticity of the rubber and a combination of properties especially useful in tires. Unfortunately, rubber did not have as high a degree of affinity for rayon as was required, and the lack of bonding was an obstacle in the realization of the expected advantages.

When a material, such as a fiber, is embedded in another material, the latter may be said to adhere by mechanical bonding. The fiber may be squeezed so tightly that no movement at the interface will occur. However, if the fiber is a substance having a hydrophilic surface, and the embedded fiber structure is immersed in water in such a way that contact between the fiber and water is possible, the water may be found to penetrate the mechanical bond and loosen it, so that the strength of the bond falls off rapidly. In this manner composite structures which have excellent dry strength are rendered unsuitable for purposes where wetting is likely to occur, such as in outdoor exposure.

The present invention is concerned with chemical bonds, in contradistinction to the mechanical bonds above described, and to such bonds which are resistant to the action of water.

Now according to the present invention it has been found that by processes in which contact, in solution, is effected between organic acido groups containing an —XH radical, where X stands for oxygen or R-substituted nitrogen, R being hydrogen or a hydrocarbon group, and basic chromium salts of monobasic acids, the basicity of the salts being no greater than about fifty per cent, there may be produced novel complex compounds of the Werner type and that by bonding the metal of such a metal-nuclear complex to a material having a negatively charged surface and polymerizing an organic polymer selected from the group consisting of polyesters, polyamides, and polycarboxylic acids in contact with an —XH group of the complex, chemical bonding may be effected between diverse materials with the production of bonded structures having improved properties.

The novel metal complex compounds of this invention are coordination compounds of the Werner type and are not to be confused with the normal metal salts. Thus, a composition in which the acido groups are coordinated with the metal differs radically in chemical properties from a composition in which the acido groups are held only by primary valence bonds such as ionic bonds. Such observed differences in properties may be explained on the basis of structure rather than empirical composition, and Werner's theory of complex compounds affords a convenient and logical basis for such an explanation.

According to the Werner theory, atoms may exert auxiliary valences as well as the principal valences occurring in simple compounds. These auxiliary valences may act to hold various groups to the atom exerting them, and the atom exerting the principal and auxiliary valences may become the nuclear atom of a complex compound or complex ion.

With particular reference to chromium, for instance, it has been found that the total number of groups which may be held within the complex by the combined principal and auxiliary valences is six. The groups so held are referred to as "coordinated groups" and chromium is said to have a "coordination number" of six. Other groups may also be associated with the chromium, but when this is the case such additional groups are present as ions and are outside of the chromi-nuclear complex. Moreover, there may be more than one chromi-nuclear atom within the complex, the chromium atoms being linked together by reason of being coordinated thru common groups known as bridging groups. With respect to each chromium atom, each bridging group occupies but a single coordination position, so that an additional five coordination groups may be present on the atom.

In accordance with the above-stated Werner theory, the compositions of this invention may be described as Werner complex compounds characterized by having therein a nuclear trivalent chromium atom associated with an organic acido group containing an —XH radical. Such acido groups, which for convenience of reference will hereinafter be designated as "functional" acido groups, may be present as simple co-ordinated groups held by either principal or auxiliary valences, or they may be present as bridging groups between two nuclear metal atoms. Particular acido groups may conveniently be designated by adding the suffix "ato" to the first part of the name of the acid corresponding to the acido group. For instance, gluconic acid gives "gluconato" groups, epsilon-aminocaproic acid gives "epsilon-aminocaproato" groups, and omega-hydroxycaprylic acid gives "omega-hydroxycaprylato" groups.

The fact that the functional groups are inside, rather than outside, the coordination spheres of the metal atoms probably accounts for the unusual chemical properties of the compositions such as the fact that they are soluble in water and are adsorbed on negatively charged surfaces from aqueous solutions. It will be understood that there may be more than one metal atom within the complex and that the metal atoms may be held together by bridging groups other than acido groups, so that for each functional acido group there may be several nuclear metal atoms within the complex, it being necessary only that within the complex there is at least one nuclear metal atom coordinated with a functional acido group. Preferably, however, the number of metal atoms per coordinated organic acido group will not be more than about ten.

In a composition of this invention the ratio of nuclear metal atoms per functional acido group within the complex preferably should be from about 1:1 to about 10:1. When two or more nuclear metal atoms are coordinated with a single acido group within the complex, the metal atoms may be coordinated with each other thru bridging groups. Various groups may function in this bridging capacity, examples, for instance, being hydroxyl (OH), aquo ($H_2O$), and acido groups, either functional or non-functional.

The groups, other than the functional acido groups, with which metal atoms are coordinated in the compositions of this invention are of secondary importance only. These groups preferably should be, from the standpoint of valence, either neutral or monovalent. The neutral groups are of course held by auxiliary valence bonds, aquo groups ($H_2O$) being a typical example. The monovalent groups are negative and are typified by such groups as chloro, bromo, formato, acetato and nitrato groups. It will be observed that groups of this type are characteristic of the anions of monobasic acids and that metal compounds containing them are salts of monobasic acids.

Acido groups which are not coordinated with the metal may, of course, be present. Such groups may be ionizable and may even ionize to give ions of the same acid which is coordinated with the metal. For instance, in a gluconato chromic chloride there may be present, in addition to the coordinated gluconato group, anions of gluconic acid which can ionize off to give gluconate ions. Similarly, such uncoordinated groups may be anions of inorganic monobasic acids such as hydrochloric acid.

The method of making a novel composition of this invention may be generically described as effecting contact in solution between organic acido groups containing an —XH radical, where X stands for oxygen or R-substituted nitrogen, R being hydrogen or a hydrocarbon group, and basic metal salts of monobasic acids, the metals being those having a resistivity less than 50 microhm-centimeters at 20° C. and having 11 to 22 electrons in their two outermost energy levels, and the basicity of the salts is no greater than about fifty per cent. The processes may be varied considerably as to details depending upon the particular composition which it is desired to produce.

The solvent used may be any substance capable of dissolving the reactants or holding them in solution. Inert solvents such as chlorinated hydrocarbons, and especially carbon tetrachloride, are satisfactory. Water may also be used, although in this case it will generally be desirable to work in as concentrated a solution as possible.

The acido groups taking part in the reaction may be derived from suitable acids such as have already been described above. The functional acido groups may also be derived from salts or esters containing acido groups. For instance, the presence of gluconato groups may be effected by the hydrolysis of the methyl ester of gluconic acid or by acidification of the sodium salt of the acid. It will be understood, of course, that the acido group is not present alone in any case but that the manner in which it is associated in the solution initially is relatively unimportant so long as a dissociation can occur to give the acido group. It has been found that carboxyl groups are particularly effective as coordinating groups and their use constitutes a preferred practice of this invention.

The presence in the reaction mixture of a basic metal salt of a monobasic acid may be effected in a variety of ways. One way is to add the previously prepared basic salt. In the case of chromium as the metal, for instance, basic chromic nitrate, $Cr(OH)(NO_3)_2 \cdot 5H_2O$ may be added in this manner. Another way is to heat a trivalent chromium salt such as chromic chloride hexahydrate $CrCl_3 \cdot 6H_2O$, in the reaction mixture, whereby a rearrangement and dehydration of the chromic chloride takes place with the formation of a basic salt.

A particularly preferred practice is to form the basic metal salt in the reaction mixture by reducing a multivalent compound of the metal to a compound in which the metal has a lower valence. Thus, in the case of chromium, chromyl chloride or chromic oxide may be reduced with an agent such as an alcohol. The alcohol in such case may act also as a solvent for the reaction mixture.

In preparing a basic salt according to this preferred practice certain precautions should be observed. The basic metal salts have a marked tendency to coordinate with hydroxyl groups, and by reason of two metal atoms coordinating with a single hydroxyl group, to form compounds of high molecular weight, this process being known as "olation." As olation takes place, compositions of high molecular weight are formed which are insoluble or only sparingly soluble in water. To minimize such olation it is ordinarily desirable to use the basic metal salt immediately after its preparation. Thus, in a preferred process the acido group is added immediately after the reduction has taken place.

As a reducing agent it has been found particularly advantageous to use alcohols and especially secondary alcohols.

The basic metal salt should be a salt of a monobasic acid, that is, an acid having a single ionizable hydrogen. The acid may be organic such as acetic or propionic, or it may be inorganic, such as hydrochloric, nitric, or hydrobromic.

The basicity of the metal salt should not be greater than 50%. The percentage of basicity of the salt may be defined as a measure of the extent to which hydroxyl ions have replaced the anions of the monobasic acid in the normal salt. In the case of the metal, chromium, for instance, chromic chloride hexahydrate, $CrCl_3 \cdot 6H_2O$, is a chromic salt of the monobasic acid, hydrogen chloride, having 0% basicity. When the hydroxyl group replaces one of the chlorine atoms a basic salt, $Cr(OH)Cl_2 \cdot 6H_2O$, is formed, and since one-third of the anionic groups of the monobasic acid has been replaced, this composition is said to be 33⅓% basic. Similarly, if two of the chlorine atoms had been replaced, the compound would be 66⅔% basic. In the present process the basicity of the metal salt should not exceed about 50% regardless of whether the salt is added as such or is formed in situ by the reduction of a multi-valent metal compound. So long as there is any basicity the Werner complex compounds will form, so that the basicity may be only a fraction of 1% if desired.

Having prepared a Werner-type complex compound by such a method as is above-described, one may, according to this invention, employ the composition for chemically bonding diverse materials by processes in which contact is effected between the metal of the complex compound and a material having a negatively charged surface, and an organic polymer selected from the group consisting of polyesters, polyamides, and polycarboxylic acids is polymerized in contact with the —XH group of the complex.

In any bond between two surfaces there are two distinct types of molecular forces involved. The first are physical or Van der Waals forces commonly having an energy of the order of 2,000 to 10,000 calories per molecule. The second type are chemical or covalent bonds, having an energy of from 10,000 to 200,000. It is the chemical, rather than the physical, type of adhesive bonds with which this invention is concerned.

It will be understood that in any process for adhesively joining two or more materials the materials being joined are essentially in the solid state. For purposes of the present discussion it will be considered that plastic materials, which will flow under definite stress, are essentially in the solid state.

When two solid materials are adhesively joined their surfaces are brought into as close proximity as possible. Where both materials are rigid, almost invariably there is a lack of conformity of the surfaces to each other, so that an intermediate adhesive layer must be employed which is sufficiently fluid to fill the irregularities in the solid surfaces and thereby establish substantial conformity between the surfaces. The mere ability thus to provide a substantially continuous interface between materials to be adhesively joined is not in itself sufficient to make a substance a good adhesive. In addition, the adhesive must have a definite affinity for the surfaces being joined. Where diverse materials, that is, materials having different chemical or physical natures are being joined a special problem is presented because an adhesive having an affinity for one of the materials may have no affinity for the other. This problem has been solved by the present invention according to which it has been found advantageous to treat the unbonded solid surface with a material of dual chemical structure such that one part of the structure will react with the solid surface, and the other part with the adhesive, thus creating a chemical bond. Such intermediate reagent of dual chemical functionality for purposes of the present description, is referred to as a "bonding agent."

It will be apparent that the need for a bonding agent may occur, not only in cases where solids are to be joined by adhesive but also in cases where a plastic coating is to be applied to a solid surface. The plastic coating may of course be applied as a liquid which subsequently is hardened to a solid. The coatings may be quite thin, as a paint or varnish film such as an alkyd resin film, or relatively thick, as in the case of plastic-inlaid objects. The bonding agent may be applied, not only where a thin adhesive layer is used between two solid surfaces, but also where solid fibers such as glass or cords of textiles such as rayon are embedded and thus held in an assembly in a plastic medium such as nylon.

One of the two diverse materials which may be bonded according to a process of this invention is a material having a negatively charged surface. Such materials are characterized by containing a substantial proportion, that is, above about 5%, of an element selected from the group consisting of oxygen and nitrogen. These elements may be present in highly polar groups such as, for instance, OH, $NH_2$, —COC—, —NH—, C—O, COOH, and $SO_3H$. Thus, there are included as materials having negatively charged surfaces ceramic materials, vitreous masses, glass, cellulose (such forms as wood, paper, cotton, hemp, cellophane, rayon and cellulose acetate), and polyamide materials, in such forms as wool, silk, gelatin, synthetic protein fibers, leather, and hides. Also included are solid materials bearing oxide or hydroxide film such as may occur on metals.

As the other of the materials which may be bonded there is used a polymer selected from the group consisting of polyesters, polyamides, and polycarboxylic acids. Polyesters will be understood to include polymers in which there is present a recurring unit containing an ester linkage. The alkyd resins, in which an alcohol containing a multiplicity of hydroxyl groups, such as ethylene glycol or glycerol, is esterified with an acid containing a multiplicity of carboxyl groups, such as phthalic acid, phthalic anhydride, or succinic acid, are representative of the polyesters which may be used. Polyamides will be understood to include polymers such as nylons in which compounds containing a multiplicity of amine groups, such as hexamethylene diamine, are interpolymerized with acids containing a multiplicity of carboxyl groups, such as adipic acid. Polycarboxylic acids will be understood to include polymers in which there are a multiplicity of carboxyl groups, and the term "carboxyl" will be understood to include the anhydrides of polycarboxylic acids such as maleic anhydride. Representative of the materials of this class, for instance, are interpolymers of styrene and maleic anhydride.

The polyesters, polyamides, and polycarboxylic acids may also contain modifying agents. For instance, the alkyd resins may contain non-drying oils such as cotton seed oil, or drying oils, such as tung oil acids, or urea-formaldehyde, phenol formaldehyde, or melamine-formaldehyde resins.

The bonding operation is carried out by forming a film or layer of the Werner-type metal complex compound at the interface between the surfaces of the diverse materials being joined and effecting polymerization of the polyester, polyamide, or polycarboxylic acid in contact with an —XH group of the complex. The material to be polymerized may be applied as the monomer or as a partially polymerized monomer. The polymerization may be assisted by applying heat and by the presence of polymerization catalysts. The tenacity of the union between the —XH group and the polymerized material suggests that interpolymerization occurs between the acido group and the material polymerized, but applicants do not limit their invention to this explanation of the mechanism of the reaction.

*Example I*

A composition of this invention, gluconato chromic chloride, was prepared in the following manner:

A solution of a basic trivalent chromium salt having a basicity of 33⅓% was made up by reducing the hexavalent chromium compound, chromic oxide ($CrO_3$), using isopropanol as the reducing agent. Thus, a solution of 33.6 parts by weight of chromic oxide in 66.4 parts of 36% hydrochloric acid was slowly added to a refluxing solution of 5.4 parts of hydrochloric acid in 94.6 parts of isopropanol. Analysis of the resulting solution showed 8.35% chloride and 7.43% chromium. The Cl/Cr ratio was adjusted to 2:1 by the addition of 4.92 parts of hydrochloric acid.

Coordination of gluconato groups with basic trivalent chromium salt was effected by adding 14.24 parts of a concentrated aqueous solution of a gluconic acid containing 80% by weight of gluconic acid, to 85.76 parts of the basic chromic solution. The isopropanol acted as a solvent in this step of the reaction. The solution was heated to reflux and allowed to cool. The product thus obtained, gluconato chromic chloride, contained 6% chromium and was soluble in water.

The composition was used as a chemical bonding agent by dipping a sheet of glass into an aqueous solution of the gluconato chromic chloride, allowing the glass to dry, superimposing upon the glass a partially polymerized alkyd resin prepared from phthalic anhydride and glycerine containing an excess of phthalic acid over the amount required for complete esterification of the hydroxyl groups of the glycerine, and heating this partially polymerized alkyd resin until it became tack free when cooled to ordinary temperature.

It was found that by the foregoing process the glass was firmly bonded to the alkyd resin and that the bond so formed did not deteriorate even upon long exposure of the structure to water. By contrast a structure prepared by joining an untreated sheet of glass to alkyd polymers according to an otherwise identical process loosened up after 100 hours exposure to water.

*Example II*

A composition of this invention containing an acido group in which the functional acido group is an amino acid was prepared in the following manner.

To 85.76 parts by weight of a basic trivalent chromium solution prepared as in Example I there was added 7.66 parts of epsilon amino caproic acid and 6.58 parts of isopropanol. The solution was heated to reflux and was then allowed to cool. There was obtained as a product a solution of epsilon amino caproato chromic chloride which was found to be water soluble and was found to be useful for treating glass for effecting chemical bonding thereto of a styrene maleic anhydride copolymer made from equi-molecular quantities of styrene and maleic anhydride.

We claim:

1. A complex compound of the Werner type consisting of a monocarboxylic functional acido group made up of a carboxyl radical joined through a carbon chain to an amine radical, the acido group being coordinated, through the carboxyl radical, with a nuclear trivalent chromium atom, the complex also containing additional coordinated nuclear trivalent chromium, the valence and coordination positions of all the nuclear chromium atoms, other than those positions occupied by coordinated functional acido groups, being occupied by groups selected from the class consisting of aquo groups, hydroxyl, and monovalent negative groups which are anions of monobasic acids, and the total number of nuclear trivalent chromium atoms within the complex being from one to ten times the number of coordinated functional acido groups.

2. A complex compound of the Werner type consisting of a monocarboxylic functional acido group made up of a carboxyl radical joined through a carbon chain to a hydrocarbon-substituted amine radical, the acido group being coordinated, through the carboxyl radical, with a nuclear trivalent chromium atom, the complex also containing additional coordinated nuclear trivalent chromium, the valence and coordination positions of all the nuclear chromium atoms, other than those positions occupied by coordinated functional acido groups, being occupied by groups selected from the class consisting of aquo groups, hydroxyl, and monovalent negative groups which are anions of monobasic acids, and the total number of nuclear trivalent chromium atoms within the complex being from one to ten times the number of coordinated functional acido groups.

3. In a process for producing a Werner-type complex compound in which a monocarboxylic functional acido group made up of a carboxyl radical joined through a carbon chain to an amine radical, is coordinated through the carboxyl with a nuclear trivalent chromium atom, the step comprising effecting contact, in solution, between a monocarboxylic acid in which the carboxyl is joined through a carbon chain to an amine radical, and a basic trivalent chromium salt of a monobasic acid, the basicity of the chromium salt being no greater than about 50 per cent and the mol proportion of chromium to monocarboxylic acid being from 1:1 to 10:1.

4. In a process for producing a Werner-type complex compound in which a monocarboxylic functional acido group made up of a carboxyl radical joined through a carbon chain to a hydrocarbon-substituted amine radical, is coordinated through the carboxyl with a nuclear trivalent chromium atom, the step comprising effecting contact, in solution, between a monocarboxylic acid in which the carboxyl is joined to a hydrocarbon-substituted amine radical, and a basic trivalent chromium salt of a monobasic acid, the basicity of the chromium salt being no greater than about 50 per cent and the mol proportion of chromium to monocarboxylic acid being from 1:1 to 10:1.

MAX T. GOEBEL.
RALPH K. ILER.

REFERENCES CITED

The following references are of record in the file of this patent:

UNITED STATES PATENTS

| Number | Name | Date |
|---|---|---|
| 2,271,228 | Nadeau | Jan. 27, 1942 |
| 2,273,040 | Iler | Feb. 17, 1942 |
| 2,316,141 | Wainer | Apr. 6, 1943 |
| 2,356,161 | Iler | Aug. 22, 1944 |
| 2,381,752 | Iler | Aug. 7, 1945 |
| 2,418,528 | Robinson et al. | Apr. 8, 1947 |
| 2,428,356 | Chester et al. | Oct. 7, 1947 |

OTHER REFERENCES

Mandl: "Zeit. Anorg. Chem.," vol. 37 (1930), pages 252, 253, 256–261, 295–298.

Duff: "Jour. Chem. Soc." (London), vol. 119 (1921), pages 385–390.

Weinland et al.: "Zeit. Anorg. Allgem. Chem.," vol. 126 (1923), pages 285–304.

Brintziger et al.: "Zeit. Anorg. Allgem. Chem.," vol. 235 (1937), pages 126–128.